FIG. 1
PRIOR ART
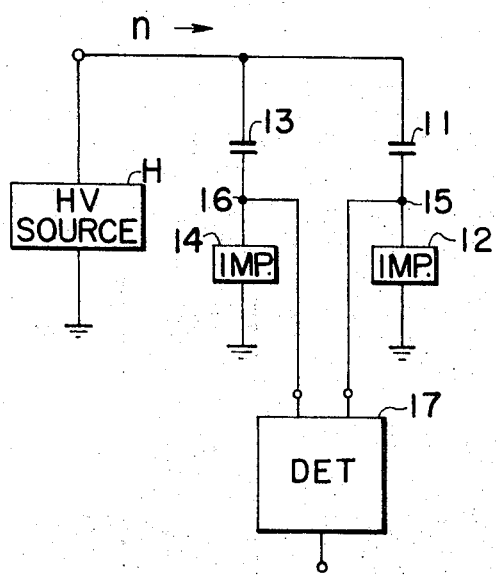
FIG. 3
FIG. 2
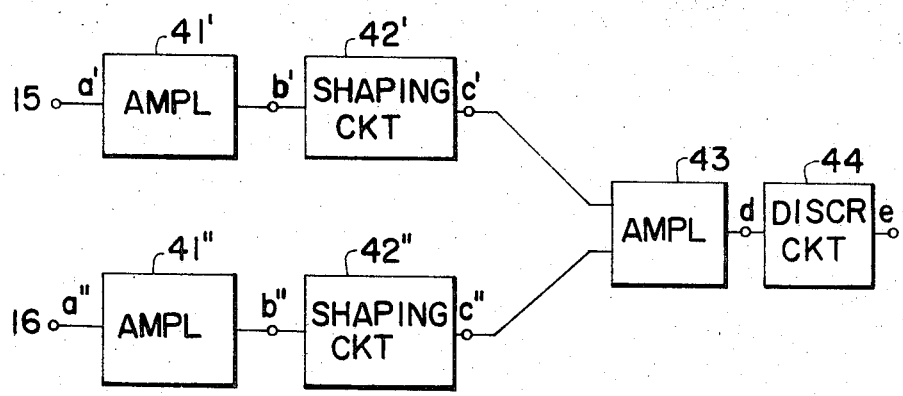
INVENTOR
HIRONORI MATSUBA
BY Mason and Torew
ATTORNEYS

United States Patent Office 3,555,413
Patented Jan. 12, 1971

3,555,413
PARTIAL DISCHARGE MEASURING MEANS INCLUDING DISCHARGE DETECTING CIRCUITS AND A DISCHARGE DETECTOR CONNECTED THERETO AND INCLUDING A SELECTOR CIRCUIT
Hironori Matsuba, Kawasaki-shi, Japan, assignor to Furukawa Denki Kogyo Kabushiki Kaisha, Tokyo, Japan
Filed June 14, 1968, Ser. No. 737,194
Claims priority, application Japan, June 15, 1967, 42/3,702; May 28, 1968, 43/35,688
Int. Cl. G01r 31/14
U.S. Cl. 324—54
9 Claims

ABSTRACT OF THE DISCLOSURE

A means for measuring partial discharge of electrical equipments, such as electric cables and transformers, having a special discharge detector, in which a detection circuit is formed by test objects, coupling condensers, and detection impedances. A defect in the test object produces partial discharge, which may be measured as discharge pulses in the discharge detector. To keep external disturbances from hampering measurement of partial discharge, pulses from the test object and the coupling condenser, after being shaped respectively, are led into a differential amplifier where external noises cancel each other. Discharge measurement can therefore be made without being hampered by external disturbances.

SUMMARY OF THE INVENTION

The present invention relates to a means for testing electric insulation, and more particularly to a circuit arrangement for partial discharge testing of the insulation of cables to determine the presence and location of defects in the insulation.

To test the insulation of electrical apparatus, such as electrical cables or transformers, a voltage is analyzed to determine whether or not the apparatus develops any partial discharge. This is known as nondestructive test.

In the case of a cable, it is essential to be able to measure the partial discharge inch by inch while moving the cable in its lengthwise direction.

In one partial discharge-testing apparatus, a detecting impedance is connected to a test object to which an A.C. high voltage is applied. When partial discharge takes place in the test object due to a defect in its installation, a pulse current flows through the detection impedance and a coupling condenser. By this method, however, it is difficult to remove external noises.

When there are substantial external noises, therefore, the following method is used. A test object, a coupling condenser, a detecting impedance having one end grounded and another detecting impedance having one end grounded together form a bridge circuit. An A.C. high voltage source, with one grounded terminal, is connected to the junction of the test object and the condenser. A discharge detector is connected between a pair of junctions. The values of the impedances are varied to balance the bridge circuit and, therefore, minimize the external noise disturbance. But, even by this method, it is very difficult to remove such disturbance effectively.

An object of the present invention is to provide an improved partial discharge testing circuit arrangement which effectively can keep external noises from coming in.

Another object of the present invention is to provide an improved partial discharge-testing circuit arrangement of high sensitivity.

A further object of the present invention is to provide an improved partial discharge-testing circuit arrangement easy in its adjustment as well as simple in its handling.

According to the present invention, there is provided a partial discharge-testing circuit arrangement which comprises at least two detecting circuits, for detecting discharge pulses flowing respectively through a coupling condenser and through a test insulation object, connected to an A.C. high voltage source, amplifier circuits for amplifying the respective outputs of the detecting circuits, shaping circuits for shaping the outputs of the amplifier circuits into pulses of a fixed height and width, and a selector circuit for selecting out only those pulses from either one of the shaping circuits. The selector circuit comprises, for example, a parity check circuit, such as a combination of a differential amplifier and a discriminator circuit.

In such circuit arrangement, external noises, which flow simultaneously through both amplifier circuits and both shaping circuits, substantially cancel each other in the partiy check circuit while discharge pulses, produced in the test object, remain intact because they flow through only one of the shaping circuits.

The invention will now be more fully described with reference to the accompanying drawings.

BRIEF DESCRIPTION OF THE DRAWING

In the drawings:
FIG. 1 is a basic connection diagram of a conventional partial discharge-testing circuit of a balanced bridge type;
FIG. 2 is a block diagram of a discharge detector of a partial discharge-detecting circuit in accordance with the invention, shown as a schematic wiring diagram in FIG. 10;
FIG. 3 shows a set of curves graphically illustrating the operation of the discharge detector in FIG. 2.

DETAILED DESCRIPTION OF THE PREFERRED EMBODIMENTS

Figure 9:
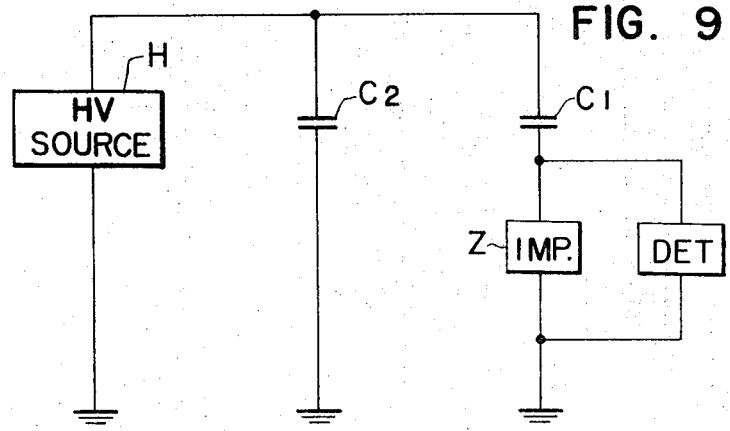
FIG. 9 is a basic connection diagram of a known discharge detecting circuit.

The first partial discharge-testing apparatus mentioned above is disclosed in FIG. 9 as including a detecting impedance Z connected to a test object $C_1$ (or $C_2$) to which an A.C. high voltage is applied. When partial discharge takes place in the test object, as due to a defect in its insulation, a pulse current flows through impedance Z and a coupling condenser $C_2$ or $C_1$.

The second partial discharge-testing apparatus mentioned above is shown in FIG. 1, wherein a test object 11, a coupling condenser 13, a detecting impedance 12 having one end grounded, and a detecting impedance 14 having one end grounded, conjointly form a bridge circuit. An A.C. high voltage source H having a grounded terminal is connected to the junction of the test object 11 and the condenser 13. The discharge detector 17 is connected between the junctions 15 and 16, and the values of impedances 12 and 14 are varied to balance the bridge circuit to minimize the external noise disturbance.

Figure 10:
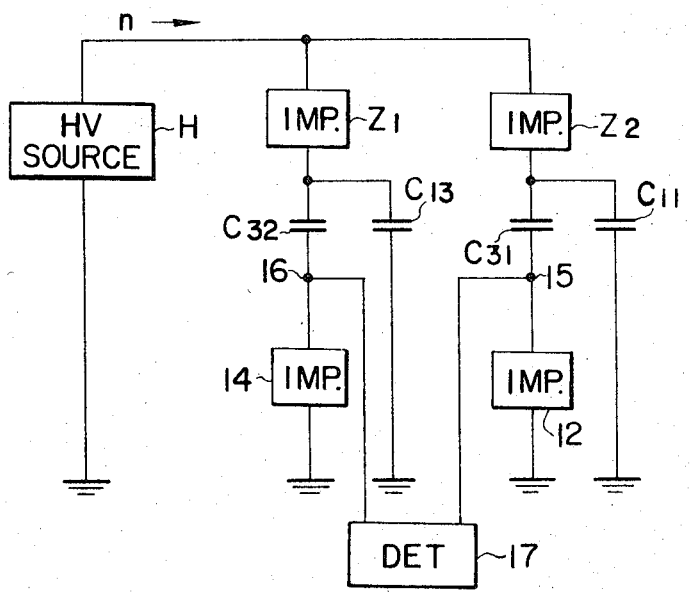
FIG. 10 is a basic connection diagram of a discharge detecting circuit embodying the invention.

Referring now to FIG. 10, $C_{11}$ denotes a test object, and $C_{31}$, $C_{32}$ and $C_{13}$, coupling condensers. Detecting impedances 12 and 14 are connected in series with the coupling condensers $C_{31}$ and $C_{32}$ respectively. Through impedances $Z_1$ and $Z_2$, a high voltage is applied to the test object $C_{11}$ and the coupling condenser 13.

The voltages that appear across detecting impedances 12 and 14 are led into a discharge detector 17 through junctions 15 and 16 respectively.

In the above circuit, a discharge pulse appears across detecting impedance 14, and is led into the discharge detector 17. Noise pulses which either come from the high voltage source H or are induced at connecting lead wires, etc., appear simultaneously across detecting impedances 12 and 14, and are also led into the discharge detector 17.

The discharge detector 17 is shown in FIG. 2. The junctions 15 and 16 are connected to the input terminals of amplifiers 41' and 41" respectively. The band width of amplifiers 41', 41" is preferably so selected that they may resolve pulses having frequencies in the range of 100–500 kc. Shaping circuits 42', 42", of identical construction, to which are led the outputs of the amplifiers 41', 41", respectively, are each composed of a monostable multivibrators, a blocking oscillator, or the like, and each of them, when given a trigger signal, generates at its output terminal a square wave pulse whose period corresponds to that of the trigger signal. The outputs of both shaping circuits 42' and 42" are led into a differential amplifier 43 of any known type, whose output is proportional to the difference between the voltages applied to its two inputs. A discriminator circuit 44, whose input is the output of the differential amplifier, allows input pulses of predetermined height and width to pass through as its output.

It will now be described how external noise disturbances can be rejected by the above circuit. It is assumed that an external noise $n$, comprising pulse components $P_1$ and $P_2$ shown in FIG. 3 comes from the high voltage source H or other parts. The noise $n$ flows simultaneously through the test object $C_{11}$ and the coupling condenser $C_{13}$, and reaches the respective amplifiers 41' and 41". The inputs $a'$ and $a''$ of the amplifiers 41' and 42", each have pulse components $P_{1a}'$, $P_{2a}'$ and $P_{1a}''$, $P_{2a}''$, appear almost at the same time. These inputs are amplified in amplifiers 41' and 41", and given, as outputs $b'$ and $b''$, to the shaping circuits 42' and 42", respectively. At the output terminals of the shaping circuits 42' and 42", there occur square wave pulse groups $c'$ and $c''$ comprising square pulse components $P_{1c}'$, $P_{2c}'$ and $P_{1c}''$, $P_{2c}''$ of a fixed height and width, whose periods correspond to those of their inputs $b'$ and $b''$, respectively. Both outputs $c'$ and $c''$ are led into the differential amplifier 43. In ideal conditions, the pulse components $P_{1c}'$ and $P_{1c}''$ or $P_{2c}'$ and $P_{2c}''$ of both inputs $c'$ and $c''$ cancel each other in the differential amplifier 43, so that there occurs no output at its output terminal. In practice, however, there exists a slight time difference between the pulses $P_{1c}'$ and $P_{1c}''$ or $P_{2c}'$ and $P_{2c}''$. (Such a time difference, though in a small degree, exists also in the discharge detection circuits and the amplifiers 41' and 41" of the shaping circuits 42' and 42".) Thus, pulses $P_{10}$, $P_{11}$ or $P_{20}$, $P_{21}$ of narrow width occur at the output of the differential amplifier 43 in accordance with the time difference between the pulses $P_{1c}'$ and $P_{1c}''$ or $P_{2c}'$ and $P_{2c}''$. The discriminator circuit 44 allows a pulse of predetermined width and height to pass through it, but blocks these narrow pulses.

When a high voltage from the source H is applied to the test object $C_{11}$ with a defect, a partial discharge is produced. A discharge pulse $P_{a3}'$ due to this partial discharge is supplied to the discharge detector 17, together with external noises as described above. The discharge pulse is amplified in the amplifier 41', shaped into a square pulse $P_{c3}'$ in the shaping circuit 42', and then led into the differential amplifier 43. Since at its input terminal there is no pulse that exists simultaneously with the pulse $P_{c3}'$, the differential amplifier 43 produces an amplified pulse $P_{3d}$, corresponding to the input pulse $P_{c3}'$, at its output terminal. The pulse $P_{3d}$ passes through the discriminator circuit 44 without being blocked. Consequently, at the output terminal of the discriminator circuit 44, there occurs pulse $P_{3e}$ corresponding to the discharge pulse to be measured.

Figure 4:
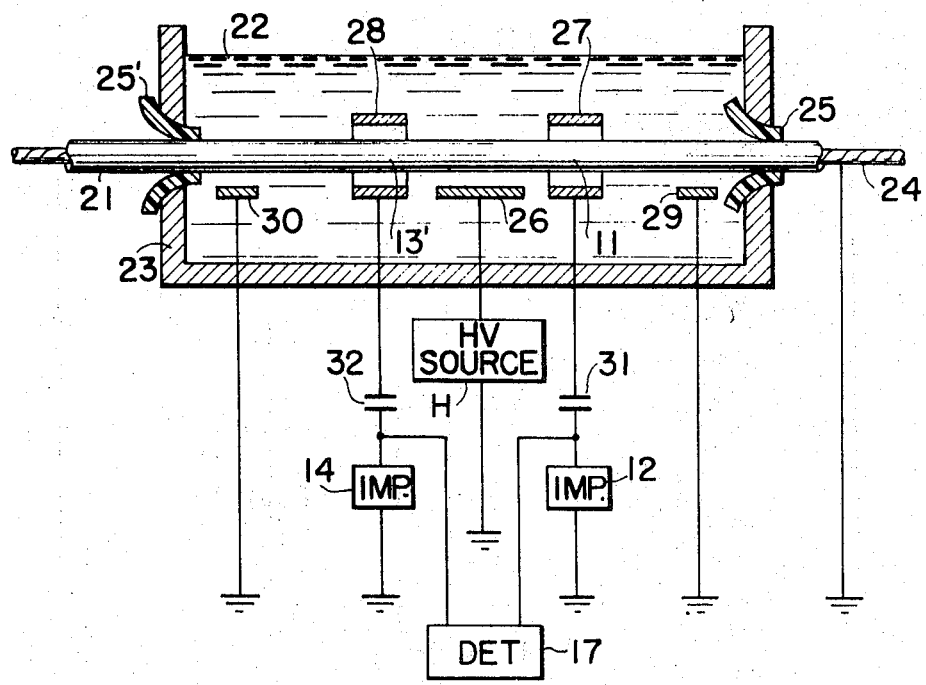
FIG. 4 illustrates an embodiment of the invention.

In FIG. 4, there is illustrated an application of the invention to an apparatus for inch by inch testing of the cable insulation. A cable 21, which is drawn from a feed drum (not shown), runs in a water tub 23 made of an insulating material, and is then wound on a winding drum (not shown). The water tub 23 is filled with a semiconductive liquid 22, such as distilled water. The conductor 24 of the cable 21 is grounded, for example, at its end on the winding drum. The portion of the tub, through which the cable 21 passes, are provided with sealing members 25 and 25'. A high voltage electrode 26 is arranged in the middle of tub 23. The electrode 26 is connected to an A.C. high voltage source H, which has one end grounded. On both sides of the high voltage electrode 26 and in the longitudinal direction of the cable, there are arranged two cylindrical detecting electrodes 27 and 28, which surround concentrically the cable 21.

In the vicinity of both ends of that portion of the cable 21 which is within the tub 23, there are arranged grounded electrodes 29 and 30. The detecting electrodes 27 and 28 are connected to detecting impedances 12 and 14, each having one end grounded, through coupling condensers 31 and 32, respectively. Both the junction point of the coupling condenser 31 and the detecting impedance 12, and the junction point of the coupling condenser 32 and the detecting impedance 14, are connected to the input terminals of the discharge detector 17 described above.

Figure 5:
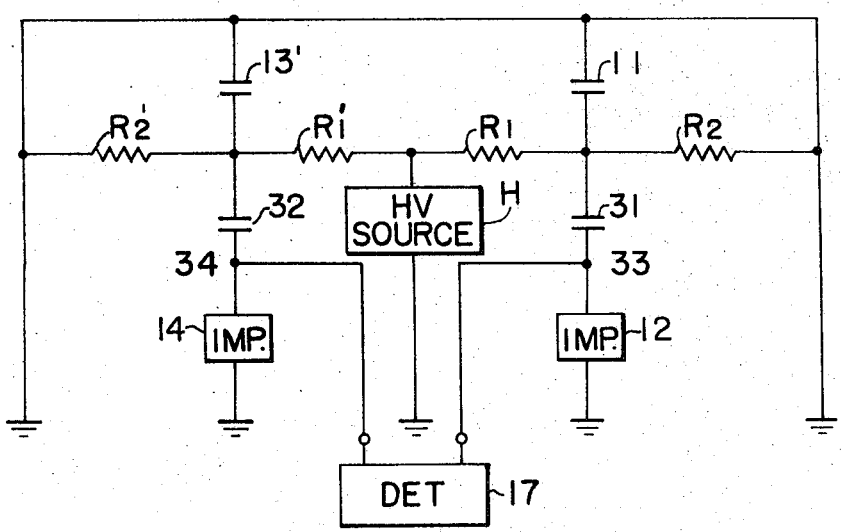
FIG. 5 is an equivalent circuit of the embodiment in FIG. 4.

FIG. 5 shows an equivalent circuit of the apparatus in FIG. 4. 11 represents a capacitance between cable conductor 24 and detecting electrode 27, and 13' a capacitance between cable conductor 24 and detecting electrode 28. The resistances of the water between the electrodes 26 and 27, between electrodes 27 and 29, between electrodes 26 and 28, and between electrodes 28 and 30 are represented at $R_1$, $R_1'$, $R_2$ and $R_2'$, respectively.

On the assumption that there is no possibility of simultaneous development of many discharge pulses in the voids in the cable insulation between the two detecting electrodes 27 and 28, the above circuit is used for continuously determining the presence and location of defects in the insulation. When a portion of the cable 21 with a defect in its insulation moves between the detecting electrode 27 or 28, a discharge pulse resulting from the defect in the insulation flows to the discharge detector 17 through the associated coupling condenser 31 or 32, so that the presence as well as the location of the defect can be determined in the discharge detector 17.

Figure 6:
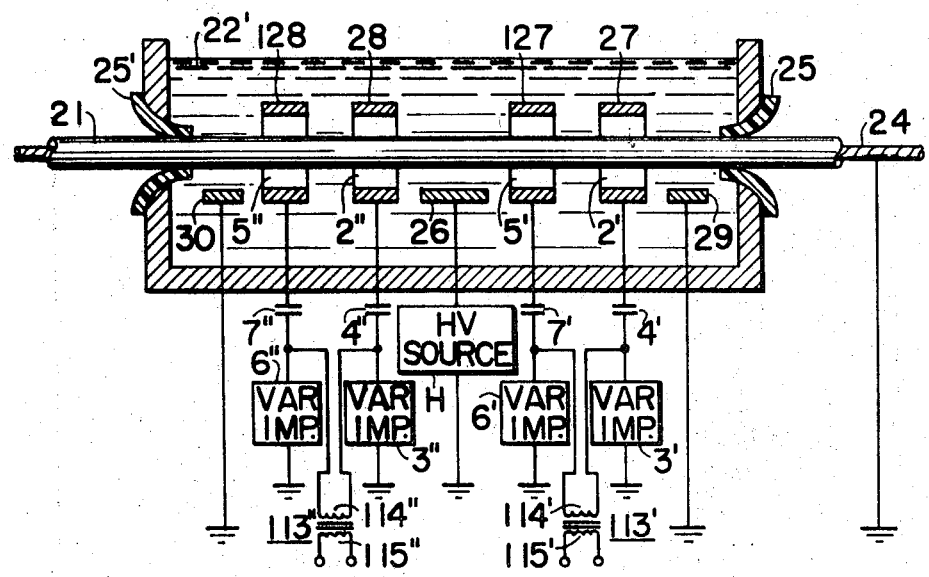
FIG. 6 illustrates another embodiment of the invention.

In an improved apparatus shown in FIG. 6, in place of the detecting electrode 27 in FIG. 4, there is provided a pair of detecting electrodes 27 and 127 arranged along the length of the cable 21, and similarly, in place of the detecting electrode 28, there is provided another pair of detecting electrodes 28 and 128. The detecting electrodes 27 and 127 are connected to variable detecting impedances 3' and 6', each having one end grounded, through coupling condensers 4' and 7' respectively. 29 and 30 designate grounded electrodes. A primary winding 114' of a transformer 113' is connected between the junction point of the impedance 3' and the condenser 4' and the junction point of the impedance 6' and the condenser 7'. Similarly, the detecting electrodes 28 and 128 are connected through coupling condensers 4" and 7" respectively to variable detecting impedances 3" and 6" each having one end grounded. A primary winding 114" of another transformer 113' is connected between the junction point of the impedance 3" and the condenser 4", and the junction point of the impedance 6" and the condenser 7". The respective secondary windings 115' and 115"

of both transformers 113' and 113" are connected to the input terminals of a discharge detector having a construction similar to FIG. 2.

Figure 7:
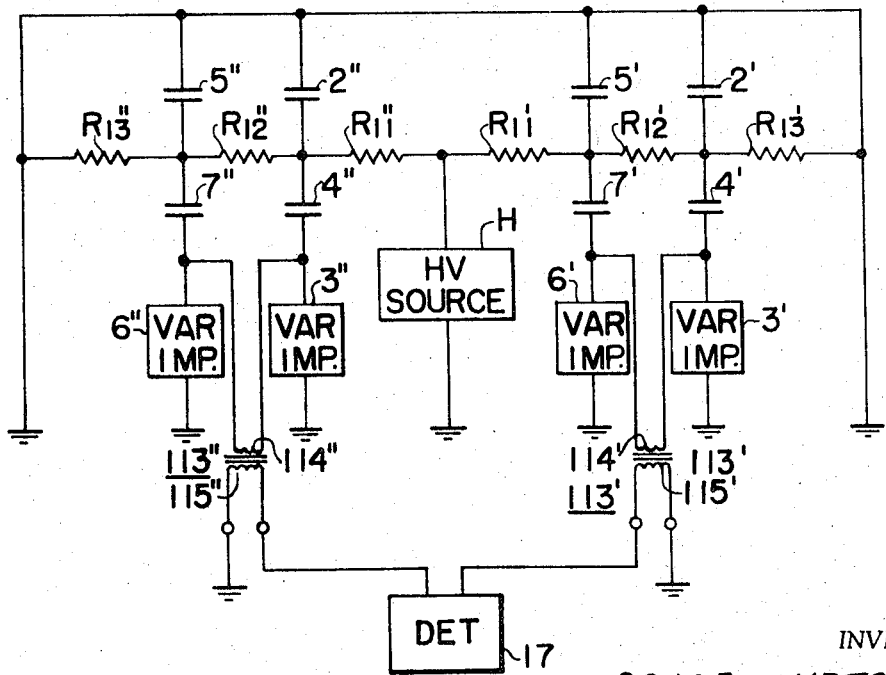
FIG. 7 is an equivalent circuit of the embodiment in FIG. 6.

The equivalent circiut of this apparatus is shown in FIG. 7. $R_{11}'$, $R_{12}'$, $R_{13}'$, $R_{11}''$, $R_{12}''$ and $R_{13}''$ represent the resistances of water between the electrodes 26 and 5', between electrodes 5' and 2', between electrodes 2' and 29, between electrodes 26 and 2", between electrodes 2" and 5", and between electrodes 5" and 30, respectively. 2', 5', 2", and 5" represent the capacitances between cable conductor 24 and the individual detecting electrodes 27, 127, 28 and 128. The variable impedances 3' and 6' are adjusted so that the potential due to external noise appearing at the junction point of the impedance 3' and the condenser 4' may be substantially equal to the potential due to external noises appearing at the junction point of the impedance 6' and the condenser 7'. The variable impedances 3" and 6" are also adjusted in the same manner. Such a method of eliminating external noises by balancing is the same as has been generally practised. The present invention makes it possible to remove more effectively such noises as cannot be removed by the conventional balancing method, by leading the above outputs of windings 115' and 115" into the discharge detector 17. The combination of the balancing circuit with the circuit in accordance with the present invention ensures more effective elimination of external noises. Thus, the apparatus has the merit of extensively rejecting external disturbances.

Figure 8:
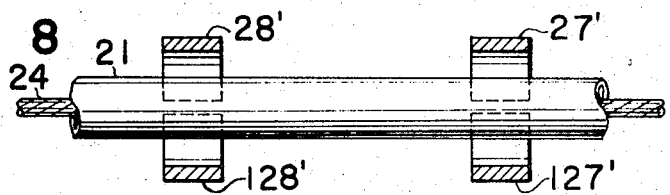
FIG. 8 shows another arrangement of the detecting electrodes in FIG. 6.

In FIG. 8, two pairs of semicylindrical electrodes 27', 127' and 28, 128', in place of cylindrical electrodes 27, 127 and 28, 128 in FIG. 6, are provided in a cylindrical arrangement around a cable 21.

What is claimed is:

1. Means for measuring partial discharge, in the testing of power cable insulation and the like, comprising, in combination, at least two electrically independent discharge detecting circuits, each including, in a respective series circuit connection, the test object, a detecting electrode capacitatively coupled to the test object, a coupling condenser connected to said detecting electrode and a detection impedance connected to said coupling condenser, whereby extraneous pulses, due to noise and the like, appear substantially simultaneously across all said detection impedances; and a discharge detector having inputs each coupled, independently of the other, to the junction of a respective detection impedance and the connected coupling condenser; said discharge detector including a selector circuit operable, responsive to substantially simultaneous appearance of pulses at all its inputs and irrespective of the amplitude and shape of the pulses at its inputs, to produce no output pulse, and operable, responsive to appearance of a discharge pulse at only one of its inputs, to produce an output pulse, said detecting circiuts being free of electrical interconnection with each other except for independent connection to the inputs of said discharge detector.

2. A means for measuring partial discharge according to claim 1, comprising at least two balancing circuits, each composed of two detecting circuits, the outputs of each balancing circuit being fed to the discharge detector.

3. A means for measuring partial discharge, according to claim 1, wherein said selector circuit comprises a differential amplifier.

4. A means for measuring partial discharge, according to claim 1, wherein said discharge detector includes at least two pulse amplifying circuits each connected to a respective input of said discharge detector, at least two pulse shaping circuits each connected to the output of a respective pulse amplifying circuit, and said selector circuit having its inputs each connected to the output of a respective pulse shaping circuit.

5. A means for measuring partial discharge, according to claim 1, wherein a length of cable serves both as the test object, at one part, and as part of a coupling condenser, at another part, for inch by inch measurement of partial discharge.

6. A means for measuring partial discharge, according to claim 2, wherein a length of cable serves both as the test object, at one part, and as part of a coupling condenser, at another part, for inch by inch measurement of partial discharge.

7. A means for measuring partial discharge, according to claim 5, wherein each detection electrode comprises a pair of detection electrodes of semi-cylindrical form arranged in facing relation and electrically separated from each other.

8. A means for measuring partial discharge, according to claim 7, wherein the length of cable extends through said facing semicylindrical detection electrodes.

9. A means for measuring partial discharge, according to claim 4, wherein there are two discharge detecting circuits; said discharge detector including two pulse amplifying circuits each connected to a respective input of said discharge detector, two pulse shaping circuits each connected to a respective pulse amplifying circuit, and said selector circuit having a pair of inputs each connected to the output of a respective pulse shaping circuit.

References Cited

UNITED STATES PATENTS

| | | | |
|---|---|---|---|
| 3,015,774 | 1/1962 | Eigen | 324—54 |
| 3,154,691 | 10/1964 | Fleisher | 307—216X |
| 3,346,808 | 10/1967 | Bader | 324—54 |
| 3,346,809 | 10/1967 | Bader et al. | 324—54 |
| 3,354,386 | 11/1967 | Daigle et al. | 324—51 |
| 2,315,450 | 3/1943 | Nyquist | 324—52 |
| 2,493,800 | 1/1950 | Biskeborn | 324—52 |
| 2,650,346 | 8/1953 | Rasor | 324—54 |
| 2,939,075 | 5/1960 | Schwab | 324—68X |
| 3,249,867 | 5/1966 | Hattersley Jr., et al. | 324—68 |
| 3,267,369 | 8/1966 | McLoad | 324—54 |
| 3,281,673 | 10/1966 | Richardson | 324—52 |
| 3,370,227 | 2/1968 | Bader et al. | 324—54 |
| 3,374,428 | 3/1968 | Eager Jr., et al. | 324—54 |
| 3,389,789 | 6/1968 | Watson et al. | 324—54UX |
| 3,430,136 | 2/1969 | Brustle et al. | 324—52 |

OTHER REFERENCES

Kreuger, F. H.: Scanning of Screened Plastic Cores for Discharges, The Institution of Electrical Engineers, Paper No. 3904M, June 1962, pp. 129–133.

GERARD R. STRECKER, Primary Examiner